Patented Dec. 4, 1945

2,390,153

UNITED STATES PATENT OFFICE 2,390,153

CONDENSATION PRODUCTS AND PROCESS OF PRODUCING SAME

Rudolf Kern, Ludwigshafen-on-the-Rhine, Germany; vested in the Alien Property Custodian No Drawing. Application May 29, 1941, Serial No. 395,732. In Germany June 26, 1940

6 Claims. (Cl. 260—72)

The present invention relates to new condensation products and a process of producing same.

I have found that new soluble nitrogenous condensation products can be obtained by treating, if desired in the presence of alcohols or phenols, with formaldehyde the products obtainable by condensing aliphatic amines containing two primary amino groups separated from each other by a chain of at least 5 carbon atoms which may be interrupted by hetero atoms, such as oxygen, and the nitrogen of imino groups, with carbonyl compounds, i. e. aldehydes and/or ketones, which condensation products are difficultly soluble in water and organic solvents. The conversion of the said difficultly soluble products (which expression—wherever used herein—includes insoluble products), especially those obtainable from the aliphatic diamines and formaldehyde, into soluble ones by the treatment with formaldehyde can be combined with their production into one operation. As initial materials there may be mentioned, for example, the completely or partly insoluble condensation products from penta-, hexa-, octo-, deka-, undeka- or dodeca-methylenediamine or mixtures of such diamines on the one hand and formaldehyde, crotonaldehyde, butyraldehyde, succinic dialdehyde, benzaldehyde, terephthalaldehyde, acetone, benzophenone or mixtures of such aldehydes and/or ketones on the other hand. For example, I may use the completely or partly insoluble products described in the copending U. S. application Ser. No. 338,374 filed on June 1, 1939, now Patent No. 2,352,387, issued June 27, 1944, in the names of Heinrich Hopff, August Weickmann and Rudolf Kern. Said application represents that the reaction between the diamine and the carbonyl compound depending upon the working conditions applied and the particular diamines and aldehydes or ketones used yields condensation products of varying degree of condensation. The products of relatively low degree of condensation are crystalline. They are suitable as plasticizers for the very highly condensed products. They may be further condensed to form products of a higher degree of condensation. They pass various stages of condensation similar to the heat hardenable resins, such as, phenolaldehyde resins. In passing the different stages of condensation they are transformed first into soluble and fusible products which are no longer crystalline or distillable, whereupon on further condensation, for example under the influence of heat and pressure, they are converted into insoluble products, thus arriving at the final stage of the condensation. The condensation products obtained are considerably more elastic than the usual phenol resins. Condensation products prepared from the said components with the coemployment of urea, thiourea, dicyanodiamidine or melamine, can also be treated in the manner described.

For rendering soluble the insoluble condensation products it is preferable to employ from 1 to 5 mols of formaldehyde per each molecule of difficultly soluble initial material, but the invention is not restricted to working with such amounts. It is frequently of advantage to perform the treatment in the heat, but simple mixing with formaldehyde is sufficient in many cases, especially if the initial materials are freshly prepared. It is advantageous to effect mechanical agitation of the reaction mixture. The formaldehyde is preferably employed in the form of aqueous solutions of usual concentration, but other forms, for example, anhydrous trioxymethylene, may also be employed. The reaction may be carried out in the presence of alcohols, for example ethyl, propyl, butyl, benzyl alcohol, cyclohexanol as well as of alcohol mixtures, for example mixtures of the said alcohols or of alcohol mixtures, such as are obtained in the reduction of low-molecular fatty acids from the paraffin wax oxidation, or in the catalytic hydrogenation of carbon monoxide under pressure. Phenols, too, may be present.

The new products which are soluble in water and/or organic solvents, as alcohols, esters, ketones and aromatic hydrocarbons, are not changed by further condensation during storage. In part they yield lacquer films which when hardened by means of acid hardeners and/or by heating possess great surface hardness, excellent elasticity, resistance to water and stability to solvents. The products can also be employed as binding agents in printing, coating or impregnating paper, textiles or metals, as adhesives, for example in the leather or wood industry, as thickening agents or binders for aqueous paints or finishes. The water-soluble products are also suitable for rendering textile materials crease-proof or animalizing them.

The following examples serve to illustrate how the present invention may be carried out in practice, but the invention is not restricted to the said examples. The parts are by weight.

Example 1

1400 parts of an aqueous 30 per cent solution of formaldehyde is run into a mixture of 812 parts of hexamethylene-diamine and 7300 parts of water at room temperature, while stirring. The white insoluble condensation product formed is filtered off by suction, washed with water, sharply squeezed off, dried at between 80° and 100° C. in vacuo and ground. It is colorless, very voluminous and elastic and practically insoluble in any solvent. It is heated to boiling for from 4 to 6 hours with three times its amount (by weight) of a 30 per cent aqueous formaldehyde solution. The aqueous solution formed can be used with advantage for rendering cell-wool or artificial silk fabrics crease-proof. In the case of cell-wool it effects an improvement of the rubbing fastness both in the dry and wet state, which properties are retained also when the material is boiled with water.

*Example 2*

48 parts of the insoluble condensation product from hexamethylenediamine and formaldehyde referred to in Example 1 are dissolved in a mixture of 60 parts of an aqueous solution of formaldehyde of 30 per cent strength and 200 parts of butanol by heating for three hours at 90° C. while stirring. From the solution obtained the water and the butanol are removed by evaporation in vacuo; a very pale resin is thus obtained which can be drawn into threads and when dissolved in butanol yields a high-quality lacquer of excellent elasticity, surface hardness and resistance to water, and which may be employed, for example, for coating metal surfaces. Advantageously this lacquer is baked at from 100° to 120° C. The reaction product can be freed from butanol also by evaporation in vacuo. It then furnishes similar effects on cell-wool materials as the product according to Example 1.

If 120 parts of formaldehyde solution are used instead of 60 parts, there is formed a bottom layer consisting of water and excessive formaldehyde, whereas the resin remains dissolved in butanol. After separating off the bottom layer, the top layer is worked up in the manner described above.

*Example 3*

1 mol of crotonaldehyde and 1.3 mols of formaldehyde are caused to react with 1 mol of hexamethylenediamine in an aqueous medium. The insoluble reaction product which is obtained in a highly swollen state is treated with four times its amount of a 30 per cent solution of formaldehyde and with butanol while stirring and heating. The solution thus obtained is suitable for lacquer purposes.

*Example 4*

To a suspension of 60 parts of urea in 300 parts of butanol there are added at ordinary temperature 200 parts of a 30 per cent. aqueous solution of formaldehyde. To the solution obtained a solution of 58 parts of hexamethylenediamine in 100 parts of butanol is added at a batch while vigorously stirring. After a short time the solution spontaneously warms to about 60° C. with formation of a stiff jelly which is passed into solution by the addition of another 200 parts of 30 per cent formaldehyde while heating. The pale resin obtained by evaporating the solution is soluble in water, alcohol and butanol and useful for various technical purposes. Paints prepared therewith are rendered insoluble by baking. As hardeners substances having an acid reaction, such as hydrochloric acid, magnesium chloride or ammonium chloride, may be added.

A similar product is obtained by substituting thiourea for urea.

*Example 5*

100 parts of the still liquid product resulting from the condensation of equimolecular proportions of $\omega.\omega'$-diamino-di-n-propylether of butanediol - 1.4 ($H_2N.C_3H_6.O.C_4H_8.O.C_3H_6.NH_2$) and crotonaldehyde (which condensation goes on with the separation of water) are passed into solution by the addition of 250 parts of a 30 per cent aqueous solution of formaldehyde and 200 parts of butanol.

*Example 6*

116 parts of hexamethylenediamine and 384 parts of cyclohexanol are heated together at from 100 to 115° C. while stirring, whereupon a mixture of 150 parts of aqueous formaldehyde of 30 per cent strength and 100 parts of cyclohexanol is added drop by drop. The water of the formaldehyde solution and the water formed in the reaction are continuously removed during the condensation by azeotropic distillation. After 12 hours' stirring at the said temperature, the reaction mixture is heated at from 140° to 150° C. for about 30 minutes. The reaction product is a pale, completely clear, viscous solution yielding films which dry in the air and by baking may have their properties yet improved. They are remarkable for their resistance to water and elasticity. Instead of the formaldehyde solution there may be employed 50 parts of trioxymethylene.

When mixing the hexamethylenediamine with cyclohexanol at ordinary temperature, the addition of formaldehyde will yield an insoluble white condensation product which becomes soluble by further reaction with formaldehyde, for example while heating in the manner described above.

*Example 7*

232 parts of hexamethylenediamine and 200 parts of phenol are fused together. 300 parts of a 30 per cent aqueous solution of formaldehyde are run in at between 100 and 150° C. with agitation and the water is removed by azeotropic distillation. The reaction mixture is then heated for 4 hours at from 150 to 170° C. The reaction product being soluble in ethanol, butanol, butylacetate and benzene is a tough resin suitable for lacquer purposes as well as for rendering textiles crease-proof.

What I claim is:

1. A process of solubilizing a water and organic solvent insoluble nitrogenous condensation product of an aliphatic diamine having at least 5 carbon atoms and a carbonyl compound selected from the group consisting of aldehydes and ketones which comprises heating said condensation product with three times its weight of 30% aqueous formaldehyde solution until said condensation product has been rendered soluble in water and organic solvents.

2. A process of solubilizing a water and organic solvent insoluble nitrogenous condensation product of hexamethylene diamine and formaldehyde which comprises boiling said condensation product with three times its weight of 30% aqueous formaldehyde solution until said condensation product becomes soluble in water and organic solvents.

3. A process of solubilizing a water and organic solvent insoluble nitrogenous condensation product of hexamethylene diamine and formaldehyde which comprises heating to 90° C. said condensation product with three times its weight of 30% aqueous formaldehyde solution in the presence of butyl alcohol.

4. A water and organic solvent soluble condensation product as obtained in accordance with the process of claim 1.

5. A water and organic solvent soluble condensation product as obtained in accordance with the process of claim 2.

6. A water and organic solvent soluble condensation product as obtained in accordance with the process of claim 3.

RUDOLF KERN.